(12) United States Patent     (10) Patent No.: US 8,147,951 B2
Slovencik     (45) Date of Patent: Apr. 3, 2012

(54) COMPOSITE AIR AND FOAM PROTECTIVE PACKAGING

(75) Inventor: Jean-Marc Slovencik, Uhrwiller (FR)

(73) Assignee: Storopack, Inc., Cincinnati, OH (US)

( * ) Notice: Subject to any disclaimer, the term of this patent is extended or adjusted under 35 U.S.C. 154(b) by 141 days.

(21) Appl. No.: 12/546,098

(22) Filed: Aug. 24, 2009

(65) Prior Publication Data

US 2010/0092758 A1    Apr. 15, 2010

Related U.S. Application Data

(60) Provisional application No. 61/091,547, filed on Aug. 25, 2008.

(51) Int. Cl.
*B32B 3/26* (2006.01)
*B29C 65/02* (2006.01)
(52) U.S. Cl. ............... 428/316.6; 428/319.3; 428/319.7; 428/178; 428/192; 264/46.5
(58) Field of Classification Search ............... 428/319.3, 428/319.7, 316.6, 178, 192; 264/46.5
See application file for complete search history.

(56) References Cited

U.S. PATENT DOCUMENTS

| 3,460,740 | A | * | 8/1969 | Hagen ........................... 206/523 |
| 3,949,879 | A | | 4/1976 | Peterson et al. |
| 4,620,633 | A | * | 11/1986 | Lookholder .................. 206/523 |
| 5,027,583 | A | | 7/1991 | Chelak |
| 5,402,892 | A | * | 4/1995 | Jaszai ........................... 206/522 |
| 5,676,509 | A | | 10/1997 | Enzu |
| 5,727,370 | A | | 3/1998 | Sperry |
| 6,546,579 | B1 | * | 4/2003 | Leventhal et al. ............. 5/655.3 |
| 6,859,948 | B2 | * | 3/2005 | Melts .............................. 2/465 |

FOREIGN PATENT DOCUMENTS

WO    WO 2006/058172    6/2006

OTHER PUBLICATIONS

Notification of Transmittal of The International Search Report and The Written Opinion of The International Searching Authority, or The Declaration, Feb. 15, 2010, 12 pages.
U.S. Appl. No. 12/724,136, filed Mar. 15, 2010, entitled Method and Machine for Making Foam Cushions, first inventor Kurt William Allen.

* cited by examiner

*Primary Examiner* — Hai Vo
(74) *Attorney, Agent, or Firm* — Wood, Herron & Evans, LLP

(57) ABSTRACT

A composite air and foam protective packaging product comprises a packaging cushion having, in cross-section, at least three plies of plastic film, foam between a first ply and a second ply of the three plies of plastic film, and air between the second ply and a third ply of the three plies of plastic film.

6 Claims, 3 Drawing Sheets

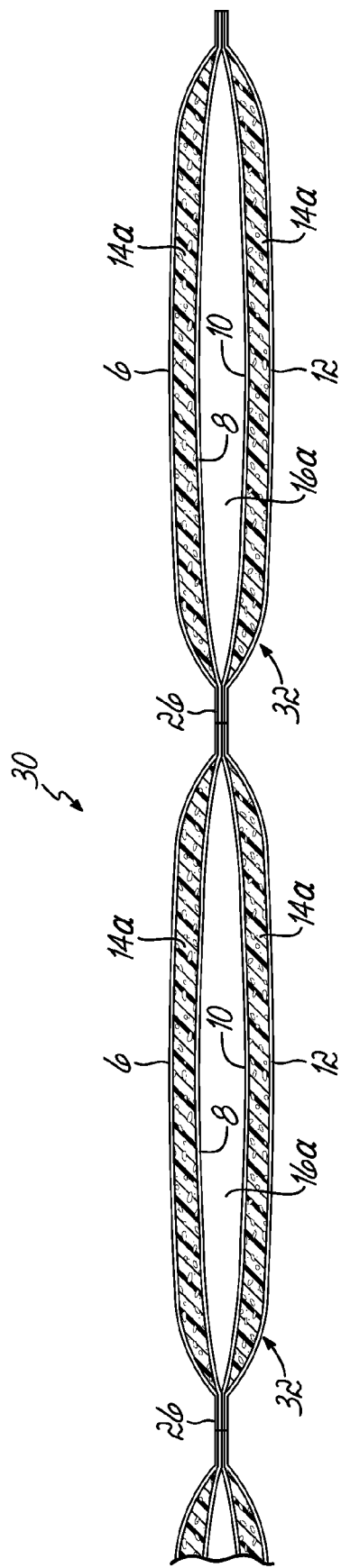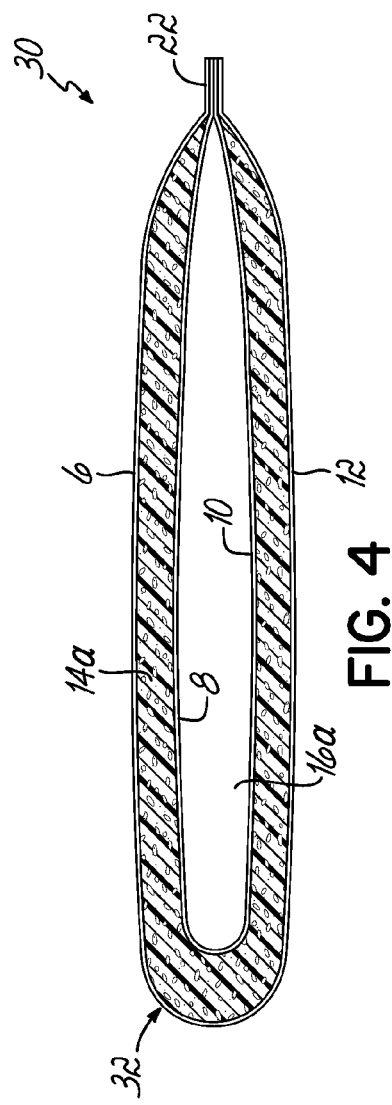

COMPOSITE AIR AND FOAM PROTECTIVE PACKAGING

RELATED APPLICATIONS

This application is a nonprovisional of, and claims priority to, U.S. Provisional Patent Application Ser. No. 61/091,547 filed on Aug. 25, 2008, hereby incorporated by reference herein as if fully set forth in its entirety.

FIELD

This relates generally to protective packaging, and more particularly to a composite protective packaging product including both air and foam.

BACKGROUND

Various types of cushioning materials have heretofore been employed as protection for an item packaged for shipment. Two such types of cushioning materials are air cushions and foam cushions. An air cushion is formed from thin plastic film that is heat sealed along one or more edges to entrap air within it. An example of an air cushion is the AIRplus® air cushion, available from the assignee. A foam cushion is formed from thin plastic film that is heat sealed along one or more edges to contain expanding foam that is injected between two plies of the film. An example of a foam cushion and a machine for making it is disclosed in U.S. Pat. No. 5,727,370, hereby incorporated by reference herein as if fully set forth in its entirety.

Each of these two types of protective packaging has its own inherent advantages and disadvantages. One advantage of air cushions is that the fill material, air, has zero cost. On the other hand, the fill material of foam cushions, foam, has significant costs in its raw starting materials (two foam precursors). One advantage of foam cushions is that the freshly injected expanding foam of the cushion will mold itself to or around the item being packaged, thereby better protecting the item. On the other hand, an air cushion is unable to mold itself to or around the item being packaged. However, air cushions have greater resilience than foam cushions.

It is desirable to devise a packaging material that combines the advantages of both air cushions and foam cushions.

SUMMARY

A composite air and foam protective packaging product comprises a packaging cushion having, in cross-section, at least three plies of plastic film, foam between a first ply and a second ply of the three plies of plastic film, and air between the second ply and a third ply of the three plies of plastic film.

The packaging cushion can have, in cross-section, four plies of plastic film, foam between the first ply and the second ply of the four plies of plastic film, air between the second ply and the third ply of the four plies of plastic film, and foam between the third ply and a fourth ply of the four plies of plastic film. The packaging cushion can have a longitudinally extending heat seal along a lateral edge thereof and a transversely extending heat seal thereacross.

A machine for producing protective packaging comprises means for providing, in cross-section, at least three plies of plastic film, means for injecting a foam between a first ply and a second ply of the three plies of plastic film, and means for injecting air between the second ply and a third ply of the three plies of plastic film.

The machine can further comprise means for advancing the plies of plastic film. The machine can further comprise means for forming a longitudinally extending heat seal along a lateral edge of the plies of plastic film. The machine can further comprise means for forming a transversely extending heat seal across the plies of plastic film.

DRAWINGS

FIG. 3 is a view taken along line 3-3 in FIG. 2.

FIG. 4 is a view taken along line 4-4 in FIG. 2.

DESCRIPTION

Figure 1:
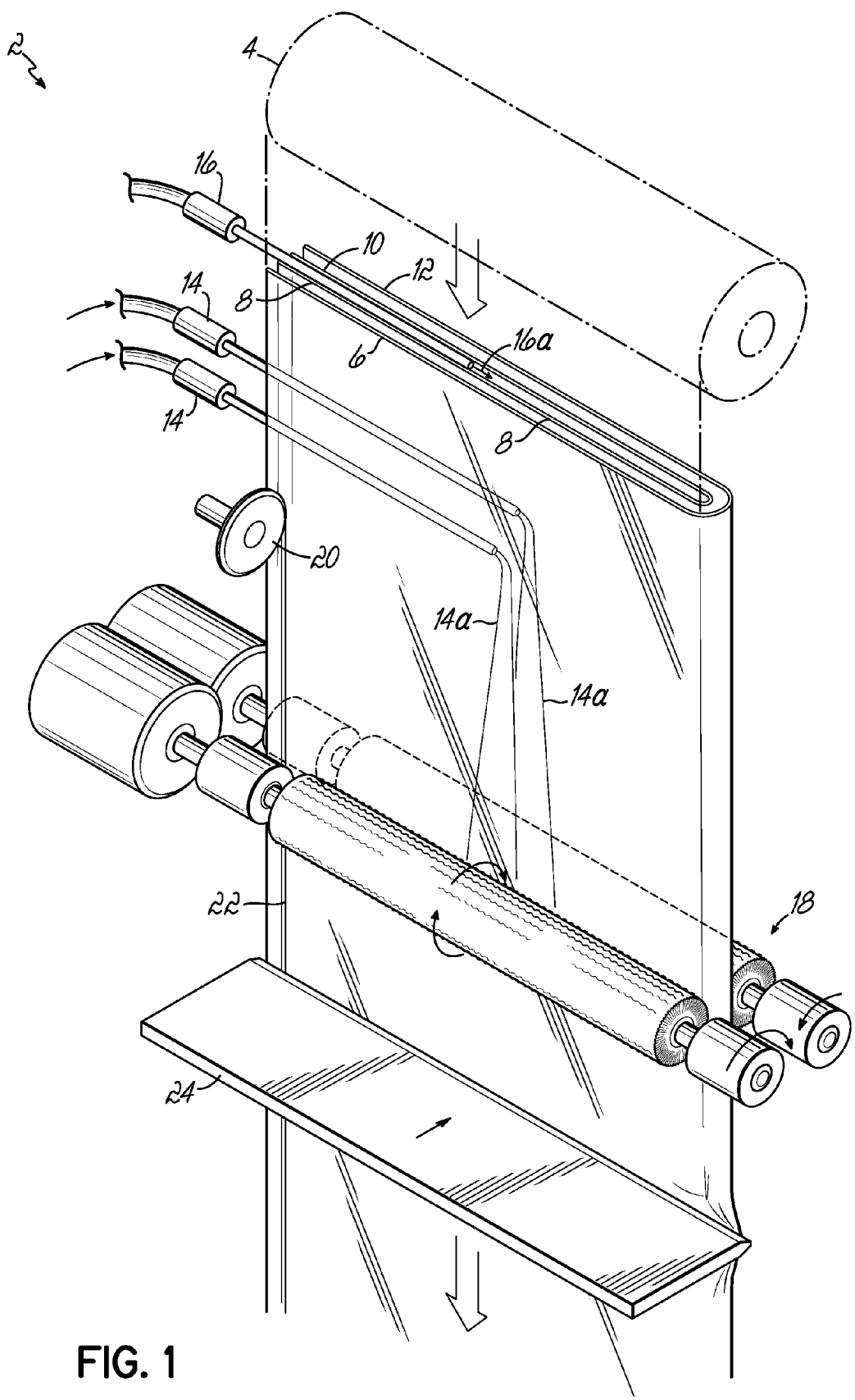
FIG. 1 is a diagrammatic perspective view of a machine for producing composite air and foam protective packaging.

Referring first to FIG. 1, a machine 2 for producing protective packaging comprises means (for example a supply roll) 4 for providing, in cross-section, at least three plies 6, 8, 10 of plastic film, means (for example nozzle, supply line, and source) 14 for injecting a foam 14a between a first ply 6 and a second ply 8 of the three plies of plastic film, and means (for example nozzle, supply line, and source) 16 for injecting air between the second ply 8 and a third ply 10 of the three plies of plastic film.

The machine 2 can further comprise means (for example a pair of counter rotating brushes and/or rollers) 18 for advancing the plies 6, 8, 10 of plastic film. The machine 2 can further comprise means (for example heat sealing roller) 20 for forming a longitudinally extending heat seal 22 along a lateral edge of the plies 6, 8, 10 of plastic film. The machine 2 can further comprise means (for example heat sealing bar) 24 for forming a transversely extending heat seal 26 across the plies 6, 8, 10 of plastic film.

Figure 2:
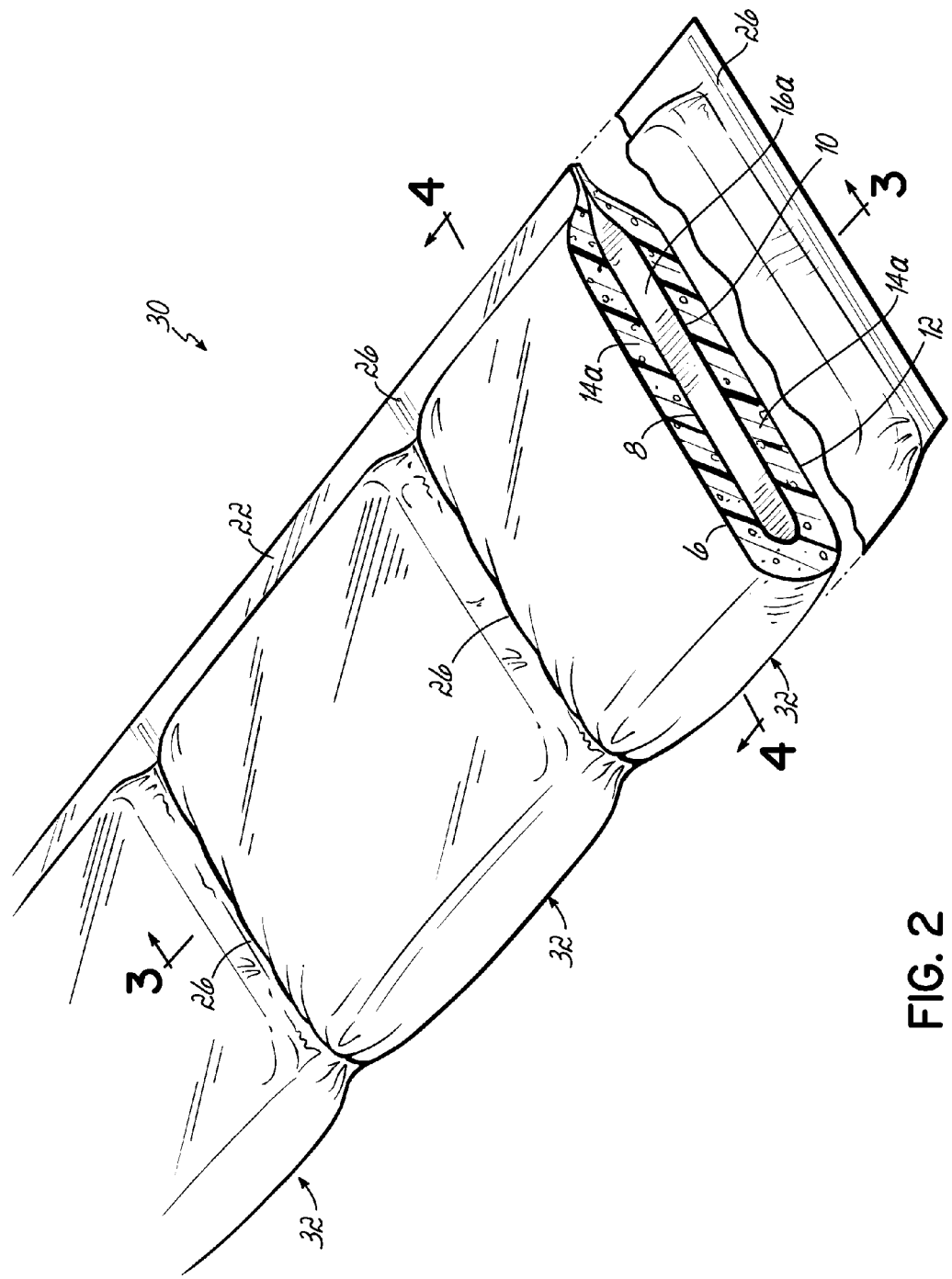
FIG. 2 is a perspective view, partially broken away in cross-section, of a composite air and foam protective packaging product made by the machine of FIG. 1.

Referring to FIGS. 2-4, a composite air and foam protective packaging product 30 made by the machine 2 of FIG. 1 is illustrated. As illustrated in FIGS. 2 and 3, the packaging product 30 comprises one or more packaging cushions 32. In FIG. 2, two complete interconnected packaging cushions 32 and a portion of a third interconnected packaging cushion 32 are shown in perspective. In FIG. 3, the two complete packaging cushions 32 and the portion of the third packaging cushion 32 are shown in cross-section along the length of the cushions 32 as indicated by line 3-3 in FIG. 2. FIG. 4 is a cross-section across the width of one of the cushions 32 as indicated by line 4-4 in FIG. 2. The composite air and foam protective packaging product 30 comprises a packaging cushion 32 having, in cross-section, at least the three plies of plastic film 6, 8, 10, foam 14a between the first ply 6 and the second ply 8 of the three plies of plastic film, and air 16a between the second ply 8 and the third ply 10 of the three plies of plastic film.

The packaging cushion 32 can have, in cross-section, four plies 6, 8, 10, 12 of plastic film, foam 14a between the first ply 6 and the second ply 8 of the four plies of plastic film, air 16a between the second ply 8 and the third ply of 10 of the four plies of plastic film, and foam 14a between the third ply 10 and the fourth ply 12 of the four plies of plastic film. (The machine 2 can have an extra means 14 for injecting foam 14a between the third ply 10 and the fourth ply 12 of the four plies of plastic film.) The packaging cushion 32 can have a longitudinally extending heat seal 22 along a lateral edge thereof and a transversely extending heat seal 26 thereacross.

The embodiments shown and described are for illustrative purposes only. The drawings and the description are not intended to limit in any way the scope of the claims. Those skilled in the art will appreciate various changes, modifications, and alternative embodiments. All such changes, modifications and embodiments are embraced by the claims. Accordingly, the scope of the right to exclude shall be limited only by the following claims and their equivalents.

What is claimed is:

1. A composite air and foam protective packaging product comprising:
　a string of interconnected packaging cushions,
　each said packaging cushion comprising:
　　in cross-section, four plies of plastic film,
　　foam between a first ply and a second ply of said four plies of plastic film,
　　air between said second ply and a third ply of said four plies of plastic film,
　　foam between said third ply and a fourth ply of said four plies of plastic film,
　　said first, second, third, and fourth plies being sealed to one another substantially contemporaneously during manufacture of said packaging cushion so as to contain said foam between said first and second plies and between said third and fourth plies while containing said air between said second and third plies, thereby defining an air cushion having an air chamber laminated with a foam cushion on each side of said air cushion, and
　　each said packaging cushion has a longitudinally extending heat seal along a lateral side edge thereof and a pair of transversely extending heat seals thereacross defining opposite end edges thereof.

2. The protective packaging product of claim 1,
　said first and fourth plies of plastic film are formed by folding a first sheet of plastic film in half along a longitudinal fold line,
　said second and third plies of plastic film are formed by folding a second sheet of plastic film in half along a longitudinal fold line.

3. The protective packaging product of claim 2,
　each of said first and second sheets of plastic film has a pair of free edges,
　said longitudinally extending heat seal sealing said pairs of free edges together.

4. A method of forming a composite air and foam protective packaging product comprising a string of interconnected packaging cushions, the method comprising:
　providing four plies of plastic film,
　injecting foam between a first ply and a second ply of the four plies of plastic film,
　injecting air between the second ply and a third ply of the four plies of plastic film,
　injecting foam between the third ply and a fourth ply of the four plies of film, and
　sealing the first, second, third, and fourth plies to one another substantially contemporaneously so as to contain the foam between the first and second plies and between the third and fourth plies while containing the air between the second and third plies, thereby defining an air cushion having an air chamber laminated with a foam cushion on each side of the air cushion,
　wherein the step of sealing the first, second, third, and fourth plies to one another comprises forming a longitudinally extending heat seal along a lateral side edge of the packaging cushion and forming a pair of transversely extending heat seals across the packaging cushion defining opposite end edges thereof.

5. The method of claim 4 further comprising the steps of:
　forming the first and fourth plies of plastic film by folding a first sheet of plastic film in half along a longitudinal fold line, and
　forming the second and third plies of plastic film by folding a second sheet of plastic film in half along a longitudinal fold line.

6. The method of claim 5 wherein each of the first and second sheets of plastic film has a pair of free edges, the method further comprising the steps of:
　forming the longitudinally extending heat seal along the lateral side edge of the packaging cushion opposite the fold lines thereby sealing the pairs of free edges together.

\* \* \* \* \*